(12) United States Patent
Rössl (10) Patent No.: US 10,679,583 B2
(45) Date of Patent: Jun. 9, 2020

(54) DISPLAY DEVICE HAVING A CONTROLLABLE DEEP-SLEEP MODE

(71) Applicant: SES-IMAGOTAG GMBH, Graz (AT)

(72) Inventor: Andreas Rössl, Graz (AT)

(73) Assignee: SES-IMAGOTAG GMBH, Fernitz-Mellach (AT)

( * ) Notice: Subject to any disclaimer, the term of this patent is extended or adjusted under 35 U.S.C. 154(b) by 0 days.

(21) Appl. No.: 16/060,358

(22) PCT Filed: Dec. 6, 2016

(86) PCT No.: PCT/EP2016/079831
§ 371 (c)(1),
(2) Date: Jun. 7, 2018

(87) PCT Pub. No.: WO2017/097736
PCT Pub. Date: Jun. 15, 2017

(65) Prior Publication Data
US 2018/0366040 A1  Dec. 20, 2018

(30) Foreign Application Priority Data
Dec. 10, 2015 (WO) ............... PCT/EP2015/079194

(51) Int. Cl.
*H04B 5/00* (2006.01)
*G09G 5/00* (2006.01)
(Continued)

(52) U.S. Cl.
CPC ......... *G09G 5/006* (2013.01); *G06K 7/10297* (2013.01); *G06K 19/027* (2013.01);
(Continued)

(58) Field of Classification Search
CPC .......... G06K 19/0705; G06K 19/0724; G06K 19/07707; G06K 19/0702; G06K 19/0723;
(Continued)

(56) References Cited

U.S. PATENT DOCUMENTS

2006/0113377 A1* 6/2006 Wilcox .............. G06K 19/0705
235/380
2007/0210923 A1* 9/2007 Butler .................. G06K 7/0008
340/572.8
(Continued)

*Primary Examiner* — Dionne Pendleton
(74) *Attorney, Agent, or Firm* — Dennemeyer & Associates, LLC (57) ABSTRACT

The invention relates to a display device implemented as an electronic price display sign, in particular designed for fastening to a rack, especially preferably designed for fastening to the end of the rack, comprising a first radio interface, which is connected to a processing stage of the display device, for communication with a base station in accordance with a first communication protocol for the purpose of controlling states of the processing stage, and a further interface, which is connected to the processing stage and is designed for contactless communication in accordance with a second communication protocol with a communication device different from the base station, for the purpose of controlling states of the display device, wherein the display device is designed to assume a storage state after exiting a delivery state for the first time, wherein the processing stage is not ready to receive data by means of the first radio interface in the storage state.

16 Claims, 3 Drawing Sheets

(51) Int. Cl.
| | |
|---|---|
| G06K 19/07 | (2006.01) |
| G06K 19/077 | (2006.01) |
| G06K 19/02 | (2006.01) |
| G06K 7/10 | (2006.01) |
| G08B 13/24 | (2006.01) |
| G09F 3/20 | (2006.01) |
| H04W 4/80 | (2018.01) |
| G09G 5/393 | (2006.01) |
| H04W 52/02 | (2009.01) |

(52) U.S. Cl.
CPC ..... *G06K 19/0705* (2013.01); *G06K 19/0723* (2013.01); *G06K 19/0724* (2013.01); *G06K 19/07707* (2013.01); *G08B 13/2448* (2013.01); *G09F 3/208* (2013.01); *G09G 5/393* (2013.01); *H04B 5/0056* (2013.01); *H04W 4/80* (2018.02); *H04W 52/027* (2013.01); *H04W 52/0229* (2013.01); *G09G 2330/021* (2013.01); *G09G 2370/025* (2013.01); *G09G 2370/16* (2013.01); *G09G 2380/04* (2013.01)

(58) Field of Classification Search
CPC ............ G06K 19/077; G06K 19/07703; G06K 19/07749; G06K 7/0008; G06K 7/10366; G06K 19/027; G06K 19/07758; G06K 19/0776; G06K 19/07773; G06K 19/07775; G06K 7/10297; G09F 3/208; G09F 3/204; G09F 3/10; G01C 22/006; G06F 19/00; G06F 19/36; G06F 21/88; G06Q 10/08; G08B 13/1427; G08B 13/2402; G08B 13/2465; G08B 13/2417; G08B 13/242; G08B 13/2434; H01Q 1/2216; H01Q 1/2225; H01Q 5/30; H04B 5/0062; H04B 15/00; H04B 1/59; H04B 5/0037; H04L 67/04; H04L 67/12; Y04S 40/18; A61B 2560/0209; A61B 2562/0219; A61B 5/0024; A61B 5/0205; A61B 5/1118; A61B 5/1123; A61B 5/14532; A61B 5/14551; A61B 5/6823; A61B 5/6824; A61B 5/6828; A61B 5/6829; A61B 5/7239; A61B 5/7264; A61B 5/742; A61B 17/43; A61B 17/435; G09G 2370/025; G09G 2370/16; G09G 2380/04; G09G 2330/021; G09G 5/006; G09G 5/393; H02J 7/0045; H02J 7/0063; H02J 7/041; H02J 7/025; H02J 2007/0067; H02J 50/12; H02J 50/60; H02J 50/80; H02J 7/0004; H02J 7/0013; H02J 7/0021; H02J 7/00036; H02J 7/0071; H04W 52/0229; H04W 52/027; H04W 52/0219; H04W 52/0225; H04W 72/0426; H04W 4/80; G01R 31/371; G01R 31/382; H01M 10/54; H01M 2010/4271; H01M 2220/30; H01M 10/425; H01M 10/4285; H01M 10/441; H01M 10/482; H01M 2/1022; Y02D 70/40; Y02W 30/84; Y10T 307/625; A01K 11/004; A01K 11/008; A01K 29/005; A01N 1/02; A01N 1/0268; A61D 19/02; A61D 19/024; A61J 3/00; B01L 2300/022; B01L 3/545; C12M 1/24; G01N 2035/00772

See application file for complete search history.

(56) References Cited

U.S. PATENT DOCUMENTS

| | | | |
|---|---|---|---|
| 2009/0033277 A1* | 2/2009 | Ludtke | G01R 31/3606 320/106 |
| 2012/0287095 A1* | 11/2012 | Cote | G06Q 10/08 345/204 |
| 2013/0217979 A1* | 8/2013 | Blackadar | A61B 5/0024 600/301 |
| 2014/0256372 A1* | 9/2014 | Karhuketo | H04B 1/59 455/501 |
| 2015/0035674 A1* | 2/2015 | Karhuketo | G06K 19/027 340/572.8 |
| 2015/0221194 A1* | 8/2015 | Sarkar | G08B 13/2465 340/870.16 |
| 2017/0351888 A1* | 12/2017 | Zhang | G08B 29/181 |
| 2018/0225486 A1* | 8/2018 | Teruyama | G06K 19/0723 |

* cited by examiner

DISPLAY DEVICE HAVING A CONTROLLABLE DEEP-SLEEP MODE

TECHNICAL FIELD

The invention relates to a display device comprising a first radio interface which is connected to a processing stage of the display device for communication with a base station in accordance with a first communication protocol for the purpose of controlling states of the processing stage.

PRIOR ART

A known display device, also called an electronic price display sign, or in technical jargon also an "Electronic Shelf Label", ESL for short, stands in radio contact with a base station during its operation and is controlled in regard to its operating state with the aid of the base station. In operation, price and/or product information on products with which the ESL is associated is represented with the aid of a display integrated in the ESL. The ESL is usually secured to a shelf track of a rack on which the particular product is kept or offered for sale. In the case of an ESL provided with an autonomous power supply, such as a battery or a solar module which charges a dry cell when exposed to light, the lowest possible energy consumption to achieve the longest possible service life plays a decisive role. One aspect which contributes to this objective is the radio protocol used for radio traffic with the base station. According to this radio protocol, only relatively short, predefined intervals of time are available for each ESL to communicate with the base station. Another aspect is the providing of operating states with highly different power consumption, namely, a sleep or resting state, when no communication can be performed with the base station, and an active state, when a communication with the base station can be performed. The interplay of these two aspects enables the longest possible operation of the ESL in a state with extremely low energy consumption, interrupted by short spans of time in which a relatively higher energy consumption is present. This operating scheme has proven to work well in routine display operation in the retail spaces of a merchant such as a supermarket when it is only a matter of communication with the base station and processing of the information to be displayed. However, it has been found in practice that on occasion, especially in operating situations differing from routine display operation, a faster responsiveness of the ESL or even an improved functionality is desirable.

The invention has therefore set itself the problem of providing an improved display device.

SUMMARY OF THE INVENTION

This problem is solved by a display device according to claim 1. The subject matter of the invention is therefore a display device implemented as an electronic price display sign, in particular designed for fastening to a rack, especially preferably designed for fastening to the end of the rack, comprising a first radio interface, which is connected to a processing stage of the display device, for communication with a base station in accordance with a first communication protocol for the purpose of controlling states of the processing stage, and a further interface, which is connected to the processing stage and is designed for contactless communication in accordance with a second communication protocol with a communication device different from the base station, for the purpose of controlling states of the display device, wherein the display device is designed to assume a storage state after exiting a delivery state for the first time, wherein the processing stage is not ready to receive data by means of the first radio interface in the storage state.

Similar to the delivery state, the invention affords the possibility for the first time of placing a display device already in use (also known in technical jargon as an "Electronic Shelf Label" or ESL for short), such as for storage purposes, in an operating state, specifically an absolute resting state, in which practically no power uptake exists, as shall be further explained in detail below. As soon as the ESL is needed once more, it can be awakened from this storage state and resume its operation in the radio network established with the aid of the respective base station. Thus, after being awakened from the storage state, it can perform a connection setup, e.g., given knowledge of the respective network key, or also perform an immediate polling of all channels provided for the ESL communication in the provided frequency band (a so-called "channel scan") in order to establish a connection with a base station within range.

The activating of the storage state is usually done in the ESL infrastructure of an operator of a store. The ESL after being delivered here has been tied into the ESL network, i.e., activated starting from the delivery state from the factory and connected to the base station by radio, after which it was in routine display mode on a rack for a certain period of time, and then finally placed in the storage state and kept at the store for later use. In temporary storage, it requires practically no power from its power supply, such as a battery.

With the teaching according to the invention also comes the advantage that for the first time the states of the display device can be influenced separate from the rigid time scheme of the first communication protocol which is used between the display device and its base station for the regular operation, generally the display of product information. The second interface and its electronic link to the processing stage as well as the use of a second communication protocol, different from the first communication protocol, form the basis for this new and advantageous functionality. In regard to the two communication protocols it should be mentioned that they preferably have a different behavior in regard to their temporal communication availability. The first communication protocol provides a very limited temporal communication capability as compared to the second communication protocol. Consequently, by contrast with the known functionality, it is now possible to achieve a fast response to commands for influencing or controlling the states at any time with the aid of a communication via the second interface. The teaching according to the invention realizes here a virtual "key" (for activating a function) or a "key pad" (for activating various functions) of the display device in the broadest sense, such that a response of the display device soon follows upon the "activating" of a virtual key. Hence, the invention solves a problem intrinsic to the first communication protocol, originating in the desire for the lowest possible energy consumption.

Further, especially advantageous embodiments and modifications of the invention will emerge from the dependent claims, as well as the following description.

By a state is meant both a resting state, in which practically no energy consumption is present (e.g., since the power supply is turned off or the data processing has been interrupted) or a relatively slight energy consumption occurs (due to heavily restricted functionality or processing capability), and an operating or processing state with relatively high energy consumption by contrast with the former. The influencing of a state will encompass both state changes or performance of processing activities in the class of operating state or resting state, as well as the transition from a resting state to an operating state and the transition from an operating state to a resting state.

The control of the states in the context of the invention may extend to known operating states whose controlling, or influencing may also be done with the aid of a communication via the first radio interface. For this, a configuration of the processing stage to receive and process commands via the second interface is provided. However, entirely new states of the display device may also be created and controlled or influenced, which bring with them an improved or expanded functionality of the display device, as shall be discussed in detail in the following. These new states may be realized either by the processing stage or by the further interface or also by the interaction of both components.

The mentioned new functionality is available at the same time or in parallel with the known functionality. There may be a prioritization of commands received via the second interface over those received via the first radio interface, so that the communication via the first radio interface is interrupted or suspended for as long as the communication is occurring via the further interface. However, the prioritization may also be the reverse of this. Furthermore, depending on the particular operating state, there may be an individual prioritization for the respective state.

The first communication protocol used for the first radio interface may be realized for example by the "ZigBee" standard, the "BlueTooth" standard, or also a proprietary protocol. The first radio interface and optionally also the processing stage have a corresponding configuration of the hardware as well as suitable software to run on this hardware in order to enable the communication by the respective communication protocol.

According to one preferred embodiment, a proprietary radio communication protocol is used, which implements a time slot communication method, by means of which several display devices can communicate with one base station. A base station serves as the interface between a wireline communication with, e.g., a data processing device (such as a server), and a wireless communication with other devices, in the present instance the display devices. According to this protocol, the display devices may at first register with a base station or be assigned to it in order to be used for a radio communication with this base station. During the registration, each display device is assigned a predefined, individual time slot for the communication with the base station. In this case, for example within n seconds, e.g., 15 seconds, m time slots will be used, e.g., 255 time slots. The n seconds form a time slot cycle, which continues to repeat itself and is also called a synchronization cycle. In this time slot communication method, m time slots are thus available within a synchronization cycle for a communication with display devices. Each of the display devices is assigned to one of the time slots, while several display devices may also be assigned to a particular time slot, such as 2, 3 or 4 display devices. In one minute, there exist 4 synchronization cycles each with 255 time slots, so that with 2 display devices per time slot, for example, a total of 2040 display devices can be addressed. If several base stations are installed in the sales premises of a retail establishment, groups of display devices which are assigned to the particular base station can be controlled.

The display devices may be synchronized for the first time with the time grid of the time slot communication method by means of a synchronization signal structure (such as a relatively short signal at the start of the respective time slot) sent out by the base station in each of the time slots in order to start the communication operation with the base station, resynchronized in the course of the operation if they have lost the synchronous state due to any given circumstances, and maintain synchronism if minor deviations from the synchronous state are present, due to uncertainties such as a drift of their internal clock.

According to the first communication protocol, each time slot is marked by a distinct time slot symbol, and the base station is designed to send out a synchronization data signal containing the time slot symbol in each of the time slots with the time grid. The display device is designed to switch from a sleep or resting state, hereinafter called the sleep state for short, to an active state at a wake-up time and receives the synchronization data signal in the active state. If the received time slot symbol indicates a particular time slot for a display device, the display device defines a new wake-up time corresponding to the next occurrence of the particular time slot in a time slot cycle following the current time slot cycle.

Each display device determines its synchronism with the base station solely by the circumstance of recognizing the time slot symbol which occurs at the time expected by it or in a waiting time window and indicates the time slot determined for it. After the display device has determined its synchronism, as explained above, it is basically enough for it to switch once more to the sleep state, because the next wake-up time is automatically known by the time grid of the time slot communication method, which is known to it. The defining of the new wake-up time may thus be confined to a time control stage (such as a timer) of the display device being restarted with the timing parameters already used before for the switching from the sleep state to the active state. After this, the display device may once more switch to the sleep state and remain there until once more a wake-up and switching from the sleep state to the active state at the new wake-up time in the next time slot cycle is carried out, triggered by the time control unit. However, the display stage need not remain in the sleep state for the rest of the time slot determined for it, but rather it may also process additional tasks in an active state even during the time slot or also the time slot cycle. The aforementioned time control unit then works in the background.

The time slot symbol may basically be chosen at will. It has proven to be especially advantageous to form the time slot symbol with the aid of a hardware address of the radio day that uniquely identifies the radio day, preferably by the lowest-order bits or the lowest-order byte of the hardware address.

A display mechanism of the display device is electronically connected to the processing stage and can be controlled by means of it. For example, the display mechanism may be realized with the aid of LCD technology, but also preferably with extremely energy-saving electronic ink technology (also called E-ink as a synonym for electronic paper).

The hardware of the display device may be realized as follows, for example. A battery, which provides a power supply of three Volts, energizes a (first) microcontroller, which basically realizes the processing stage. The microcontroller may have an internal memory or also be connected to an external memory.

The microcontroller as a component of the first radio interface may comprise an integrated coprocessor as well as other electronic components for realizing the first radio interface or be coupled to them, so that the communication according to the first radio communication protocol is carried out with the aid of the coprocessor. This is connected to a first antenna of the first radio interface.

Furthermore, the hardware of the display device comprises the mentioned display mechanism, which besides the mentioned display technology may also possess a second microcontroller coupled to the first microcontroller in order to handle display-specific tasks assigned to it in autonomous fashion.

The first microcontroller is furthermore coupled to the second interface.

The second interface may be designed to communicate in capacitive and/or inductive manner. According to one preferred embodiment, it is designed for the communication according to a RFID specification (or a RFID standard), such as ISO/IEC 10536, 14443, 15693, 10373 or VDI 4470, 4472 or ISO/IEC 18000 or EPC global or ISO/IEC 15961, 15962 or future specifications. This enables not only a reliable communication, especially over relatively short distances, so that a pairing between the display device and a communication device designed as a RFID reader is ensured simply by the required spatial proximity of the two devices to one another, but also the electrical power supply by the field used for the communication (such as an electrostatic, magnetic, electromagnetic dipole field). It has proven to be especially advantageous when the second interface is designed for communication according to a NFC specification, such as ISO/IEC 13157, -16353, -22536, -28361 or future specifications. This brings the advantage that the display device can also communicate in the active NFC mode, i.e., in the reader mode.

As mentioned in the beginning, the display device has the active state and the sleep state, while these states are provided with the help of the processing stage. In the active state, the processing stage is designed to receive data via the first radio interface. In the sleep state, the processing stage has no readiness to receive data via the first radio interface. According to one aspect of the invention, the display device is designed so that at least during the sleep state as well the processing stage is ready to receive data via the further interface. This configuration need not be limited only to the sleep state, but can also be available for the active state. This configuration may be provided, e.g., by a connection of the hardware implementing the NFC or RFID interface to the first microcontroller with the aid of a data bus or a serial connection for the data communication as well as a coupling of the NFC or RFID hardware to an interrupt input of the first microcontroller. Thus, e.g., whenever the further interface is activated from the outside of the display device with a RFID or NFC-capable device, an interrupt will be triggered in the first microcontroller and a readiness to receive data via the further interface will be provided there with the aid of suitable software routines.

Insofar as the implementing of the further interface is done on a RFID or NFC basis, the power supply generated with the aid of the RFID or NFC-capable device in the display device (such as by inductive coupling) to operate the RFID or NFC hardware may furthermore be used as well for the operation of the first microcontroller, and thus to achieve an improved battery life. Power supply selecting means can be provided for selecting the power supply needed for the operation of the first microcontroller, which make the choice of the power source for the power supply of the first microcontroller in dependence on the availability and quality of the power supply provided with the aid of the further interface.

The occurrence of a usable power supply at the NFC or RFID module for the operation of the further interface, i.e., the NFC or RFID module, may also be used as a trigger for said interrupt at the first microcontroller, because only after this is a data transfer possible via the further interface and/or because only with this power supply is an operation of the first microcontroller possible for the processing of data.

According to another aspect of the invention, the processing stage is designed to assume a delivery state. This new state differs from the usual state behavior in that at no time is there a readiness to receive data via the first radio interface. In the delivery state, namely, the processing stage is not able to switch to the active state by itself. This delivery state is adopted at the factory during the production of the display device. In the delivery state, no power requirement exists, because the processing stage does not need to be supplied with any electric power, nor is it so supplied. It may even be separated from its internal battery. The same holds for all other electronic components of the display device.

This stands in glaring contradiction with known procedures, in which the processing stage is in full operation already upon its delivery, i.e., it switches from its sleep state to the active state by an internal timing, and at more or less periodic intervals, such as every 30 minutes, attempts to contact a base station in order to form a connection with it.

The fact that the processing stage is in the delivery state can be registered in one of its memory components (such as EEPROM) by the value of a bit, which is checked by the processing stage after being started for the first time in order to institute the steps needed for the normal operation.

Furthermore, the display device is designed, with the aid of the further interface, to start the readiness of the processing stage to receive data via the first radio interface. As explained above, this can occur by establishing an operating voltage when the further interface is activated from the outside. The second interface may also verify the information which determines whether the processing stage is being started for the first time and accordingly activate the power supply for the processing stage through the internal battery, after which the autonomous data processing of the processing stage is assured.

A further aspect of the invention relates to the first-time setup of a connection to a base station. In departure from the known procedures in which, after making successful radio contact with a base station, a network key for the encrypted communication with the base station is relayed via a communication with said base station to the display device, the invention discloses a much more secure setup of a connection with the base station. For this purpose, the processing stage is designed, before or after the first-time start of its reception readiness, to receive a network key via the further interface for the purpose of encrypted communication with the base station and after receiving the network key it is designed to assume a connection setup state for the purpose of establishing a radio link with the base station making use of the network key via the first radio interface. The network key for the communication for the first radio interface is thus relayed via an interface other than the first interface. Only then does the setup of a connection begin via the first radio interface making use of the network key. Insofar as the further interface is designed as a RFID or NFC interface, an intercepting of the network key being transmitted can be practically ruled out for two reasons, since on the one hand the RFID or NFC communication requires proximity of the devices so communicating and on the other hand the network key being transmitted can already be transmitted in an encrypted RFID or NFC communication.

As discussed in the beginning, the display device is designed to assume a storage state, especially after exiting from a delivery state for the first time, while in the storage state there is no readiness of the processing stage to receive data via the first radio interface. Also in this storage state it is possible to turn off the power supply by the battery and the state itself may be retained in memory with the help of a bit value, so that after renewed activation the proper steps can be taken to resume operation. By contrast with the delivery state, the ESL now already has the network key for communication with the base station.

Two possibilities may be considered for entering the storage state. The processing stage may be designed to assume the storage state as a result of receiving data via the first radio interface. This is advantageous when the storage state is supposed to be initiated by the radio network of the base station, i.e., for example by the inventory management system of the retailer. However, the processing stage may also be designed to assume the storage state as a result of receiving data via the further interface, which is advantageous when this state is only supposed to be initiated by direct interaction with a portable communication device of an employee of the retail establishment.

It is especially advantageous when the display device is designed making use of the further interface in order to restart the readiness of the processing stage to receive data via the first radio interface. In this case, steps can be taken as were discussed in connection with the delivery state and the first-time making of the processing stage ready for a reception, wherein—as already mentioned—the network key for the communication with the base station is already stored in the ESL.

According to another aspect of the invention, the processing stage is designed to receive data representing operating parameters via the further interface and store this data, wherein the operating parameters influence the states of the display device during the communication with the base station. This may involve, e.g., latency settings, which serve for achieving a faster response of the display device in the communication with the base station or for defining a slower behavior, which is manifested however in a longer battery life. This data representing the latency settings may also serve for the purpose of assuming the storage state. In this way, the responsiveness of the ESL is reduced (slowed down) so much that it now only switches from the sleep or resting state to the active state for example every 10, 100, 1000 or 10,000 time slot cycles, or generally a freely definable multiple of a time slot cycle (also called a synchronization cycle), in terms of the time grid of the time slot communication method. The duration of the sleep state is extended over several time slot cycles in which no active state is adopted, in departure from the usual timing of the normal operation (the routine display operation) of the ESL. In the storage state so adopted, the cycle of a regular active state and a prolonged sleep state repeats until the ESL receives a command to end the storage state.

The ESL may be placed back in normal operation with the aid of a communication via the further interface from the storage state and be synchronized with the time slot communication method. This special variant of the storage state, however, also makes it possible to return the ESL to normal operation with the aid of a communication via the first radio interface—i.e., a communication with the base station—since the ESL over the course of time always has its active state once more after the elapsing of the extended sleep state by listening for commands sent out by the base station.

In routine display operation, a display device is logically connected to a base station, i.e., it is logged in with the base station and can only receive commands and data from it. In a system made up of several base stations, in which for example a first group of display devices is assigned to a first base station and a second group of display devices to a second base station, it may happen that a display device of the first base station needs to be assigned to the second base station. With a conventional display device, which would first need to ascertain the changed radio network configuration with the aid of the first communication protocol, e.g., as a result of moving the display mechanism from location A to location B, this reallocation would often take longer than is expected by the operating personnel, which may lead to misunderstandings in the handling of the display device, even to a suspecting that it is malfunctioning. In order to deal with this problem, the processing stage is designed to receive and execute a reconnect command with the aid of data received via the further interface in order to again assume a connection setup state in order to establish a radio link with a base station. Thus, an ad hoc reallocation of the display device to a base station can be started regardless of the automatic reallocation functionality existing by virtue of the first communication protocol.

It has proven to be especially advantageous for the processing stage to be designed to visualize the state information while making the new connection, representing the existence of the connection setup state. This feature allows the personnel to directly check on the progress of the relaying of a reconnect command sent via the further interface with the aid of a portable communication device.

During the communication via the further interface the entire power supply of the ESL may occur with the aid of the communication signals, and so the internal battery remains totally load-free, which has advantageous impact on the maximum expected operating time of the ESL.

Basically, this advantageous powering of the ESL may also be used in all other instances of the communication in which corresponding signals are available at the further interface. The ESL may be configured internally such that the powering of the ESL by the internal battery is interrupted when signals which may be used for the power supply are present at the second interface. This can be accomplished by a controllable design of the internal power supply of the ESL and also by a control signal which can be generated by the further interface signal (see, e.g., the "power supply control signal VC" in the description of the sample embodiments) for the control of the internal power supply. The internal power supply may also be separated by switching means from the electronic components of the ESL that are being powered. At the same time, the power supply means of the further interface making use of said signals generate the power supply needed for the operation of the ESL or the respective active electronic components and energize them with it.

A display device according to the invention may also be designed to again assume the delivery state even after exiting the delivery state. For this purpose, the processing stage is designed to recognize and execute a first reset command (first master reset command). This first reset command may be received via the first radio interface from the base station. According to one preferred embodiment, however, the processing stage is designed to receive and execute a first reset command for assuming the delivery state that is received with the aid of the further interface. After the execution, the display device is again in the delivery state.

A display device according to the invention may also be designed to again assume the storage state even after exiting the storage state. For this purpose, the processing stage is designed to recognize and execute a second reset command (second master reset command). This second reset command may be received via the further interface from the base station. According to one preferred embodiment, however, the processing stage is designed to receive and execute a second reset command for assuming the storage state that is received with the aid of the further interface. After the execution, the display device is again in the storage state.

For both reset commands it may be advantageous if the execution of the commands in the display device depends on whether a correct password was provided during the relaying of the command. The password may on the one hand be previously set with the aid of the base station via the first radio interface or on the other hand preferably via the further interface. The administrative rights for the respective password may be set, for example, such that the relevant password for the first reset command may only be set by the maker of the ESL, whereas the relevant password for the second reset command may be set by the maker of the ESL and/or the user of the ESL (i.e., the operator of the supermarket). Thus, abuse or theft of the ESL may be prevented, since its further use, if at all, would only be possible to a very limited extent.

These and further aspects of the invention will emerge thanks to the following discussed figures.

BRIEF DESCRIPTION OF THE FIGURES

The invention shall now be explained further with reference to the enclosed figures and with the aid of sample embodiments, although the invention is not limited to this. The same components in the various figures are given identical reference numbers. There are shown, schematically.

DESCRIPTION OF SAMPLE EMBODIMENTS

Figure 1:
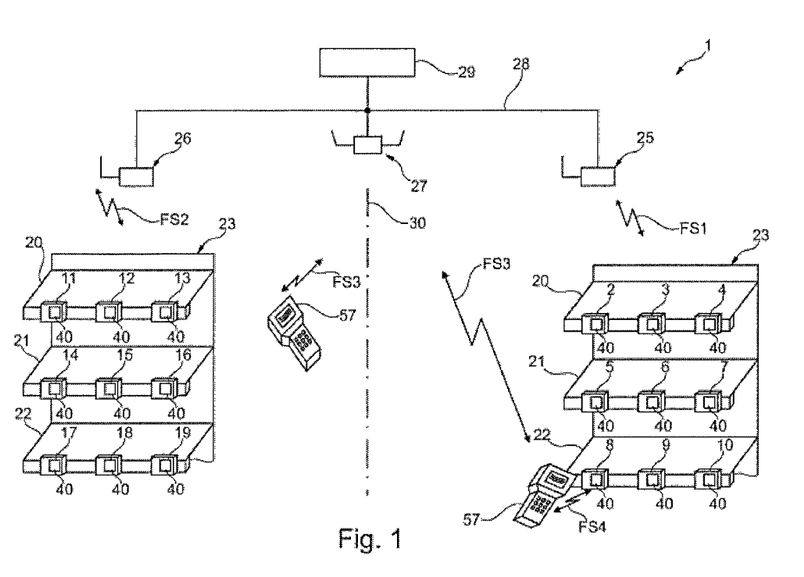
FIG. 1 a system according to the invention.

FIG. 1 shows a system 1 according to the invention, installed on the premises of a supermarket, for radio communication with display devices according to the invention implementing electronic price display signs, for short ESL 2-10 and ELS 11-19. Each ESL 2-19 has a display 40 and is arranged on rack bottoms 20-22 of a rack 23 corresponding to products position on the rack bottom (not shown), for which price and/or product information is displayed by this means. The system also has two base stations 25 and 26, the first base station 25 being in radio contact with the ELS 2-10, symbolized by first radio signals FS1, and the second base station 26 with the ELS 11-19, symbolized by second radio signals FS2, with the aid of a proprietary first communication protocol. The logical coordination (e.g., through different radio channels) of the groups of ESL 1-10 and 11-19 with the respective base station 25, 26 is visualized by means of the line 30. It should also be noted in this place that there need be no physical separation of the radio areas, as was represented in FIG. 1 for reasons of clarity. The radio areas could also overlap (e.g., in part). The system 1 furthermore has a WLAN access point, hereafter called access point 27 for short, which is represented centrally and covers the two radio areas to left and right of the line 30. However, there might also be more access points 27 present, in order to cover the entire sales space with radio waves. The system 1 also comprises portable electronic barcode readers 57 (only two are shown), by means of which barcodes applied to products or the ESL 2-19 can be detected by the personnel of the supermarket in order to match up the respective ESL 2-19 with the respective product in the inventory management system of the supermarket. The barcode reader 57 is WLAN-capable and stands in radio contact with the access point 27 by means of a WLAN radio protocol, which is symbolized by third radio signals FS3. The access point 27 and the two base stations 25, 26 are connected by a wireline network 28 to an inventory management system server 29 of the supermarket.

Figure 2:
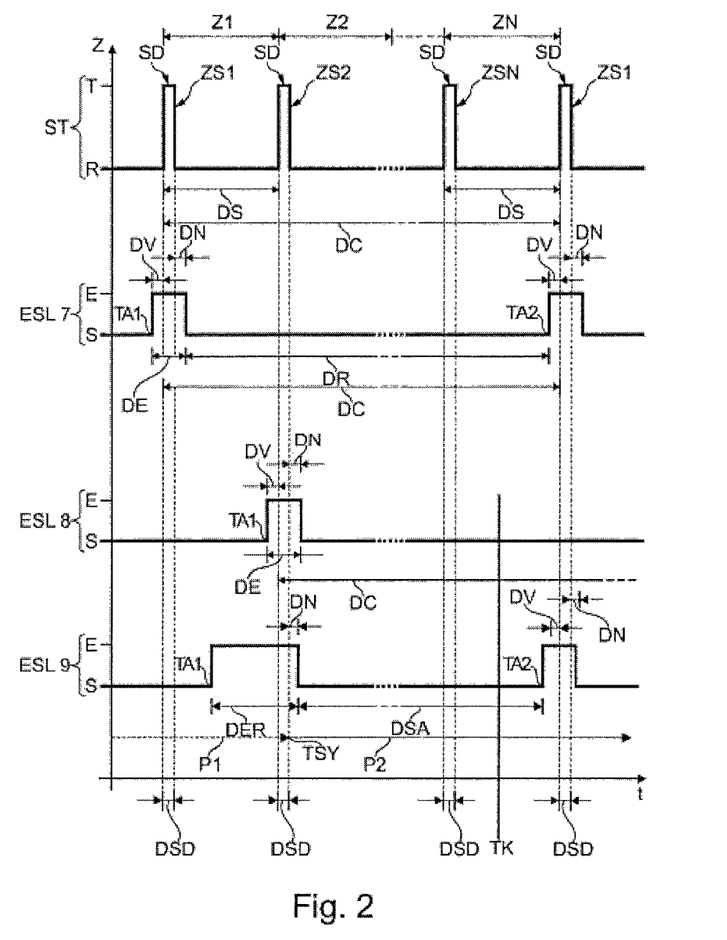
FIG. 2 a state diagram to explain a proprietary communication protocol.

In the following, with the aid of FIG. 2 the time slot communication method used in the system 1 and forming the first communication protocol shall be discussed. The state diagram shows the time t on the x-axis and the communication states on the y axis for the exemplary ESL 7-9 and the first base station 25. Here, T indicates a transmit state and R a receive state of the base station 25 and E represents a reception-ready active state and S an energy-saving sleep state of ESL 7-9, in which no reception readiness exists.

During a time slot cycle duration DC (such as 15 seconds), there are N time slots Z1 ... ZN (for example 256) available with identical time slot duration DS (such as roughly 58 milliseconds. During the time slot cycle duration DC, the base station 25 (indicated by symbol "ST") switches between the transmit state T and the resting state R. The transmit state T is always assumed at the start of a time slot Z1 ... ZN and maintained for a synchronization data signal duration DSD (or transmit time duration DSD of the synchronization data signal SD) in order to send the respective correct time slot symbol ZS1, ZS2, ... ZSN with the respective synchronization data signal SD. The respective time slot symbol ZS1 ... ZSN used is the current number of the respective time slot Z1 ... ZN in the sequence of occurrence of the time slots Z1 ... ZN. Consequently, the first time slot Z1 in hexadecimal notation (indicated by "Hex") is designated by the time slot symbol Hex QQ, the second time slot Z2 by the time slot symbol Hex Q1, etc., and the last time slot ZN (in the present example, the two hundred and fifty-sixth-time slot Z256 by the time slot symbol Hex FF.

The first ESL 7 is in the synchronous state. It is awaiting a first wake-up time TA1 from its sleep state S and switches with a relatively short lead time DV prior to an expected occurrence of a synchronization data signal SD into its reception-ready active state E, receives the synchronization data signal SD during a reception time duration DE with the first time slot symbol ZS1 (Hex 00), compares the lowest-order bytes B0 of its hardware address (Hex00) with the received time slot symbol ZS1 to determine that the first time slot Z1 determined for the first ESL 7 is indicated (the bytes compared: BQ of the hardware address and first time slot symbol ZS1, match up), maintains the parameters of its time control stage used to control the wake-up for the awakening in the following time slot cycle in order to define the new wake-up time and switches with a relatively short lag time DN back to the sleep state S in order to wake up after the lapse of the scheduled sleep state dwell time DR as planned at the new (second) wake-up time TA2 with said lead time VD prior to the new beginning of the first time slot cycle Z1. The same holds in similar fashion for the second ESL 8, which is in the synchronous state the same as the first ESL 7.

The third ESL 9 prior to a synchronization time TSY is in the asynchronous state, as indicated by the arrow P1 with broken running parallel to the time axis. It is waiting for a randomly selected first wake-up time TA1 and switches from its sleep state S to the reception-ready active state E and waits in this state until receiving the next occurrence of the synchronization data signal SD, while in the present case the second time slot symbol ZS2 (Hex 01) is received. The third ESL 9 recognizes by means of the lowest-order bytes BQ (Hex 00) of its hardware address that the time slot determined for it in the present time slot cycle is already in the past and consequently the next time slot with the time slot symbol Hex 00 is expected only in the next time slot cycle, and it calculates that the currently recognized time slot Z2 lies one time slot next to original time slot Z1, hereinafter designated as the time slot difference. In the third ESL 9, its time control stage is now programmed such that the new wake-up time TA2 as in the case of an ESL which is present in the synchronous state lies with the mentioned lead time DV before the occurrence of the first time slot Z1 of the following time slot cycle. The dwell time DSA of the waiting in the sleep state S is automatically calculated. Thus, the third ESL 9 finds itself once more in the synchronous state, as indicated by the second arrow P2 with solid line, and it switches from the active state E to the sleep state S, in order to switch back to its active state after the lapsing of the dwell time DSA at the new wake-up time TA2.

The above described first communication protocol allows an automatic connecting to the respective base station 25, 26, which however entails—primarily due to the long phases of the sleep state—the relatively tedious process of searching for radio signals in the available radio channels, until the connection to a base station which is found can occur and through this base station 25 or 26 a communication with the server 29 can occur. According to the invention, the ESL 2-19, for which we shall refer below to ESL 8 as being representative of them, has the architecture visualized in FIG. 3, with the aid of which a significantly improved functionality is achieved.

Figure 3:
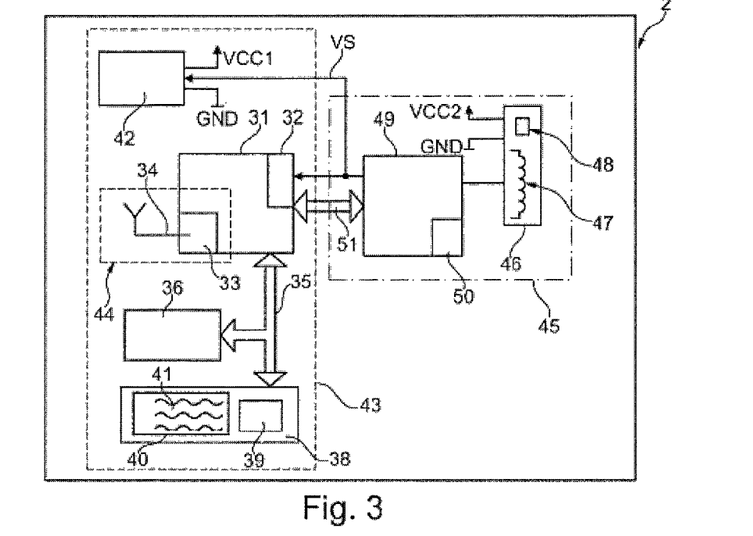
FIG. 3 a block diagram of a display device.

ESL 8 has a processing stage 31 for providing the operating states such as the active state and the sleep state. The processing stage 31 is realized with the aid of a first microcontroller, which [has] an internal memory 32 as well as a co-processor 33, which is connected to sending/receiving means 34 for the communication with the base station 25, 26. The processing stage 31 is connected via a first bus system 35 to an external memory 36 and to a display mechanism 38. The display mechanism 38 has its own (third) microcontroller 39 for display-related data processing and an electronic ink-based display 40 for the visualization of information 41.

A power supply stage 42, which is realized with the aid of a battery 42, provides for the described electronic components a first power supply VCC1 with respect to a reference potential GND. The described electronic components are indicated in FIG. 3 as display module 43. The co-processor 33 and the sending/receiving means 34, of which only an antenna is visualized symbolically, form a first radio interface 44 for the communication according to the above described time slot communication protocol. With their aid, operating states can be controlled, such as the processing of commends for the updating of the display or the providing of status information.

However, ESL 8 also has another interface realized with the aid of a NFC module 45. The NFC module 45 comprises analog components 46, including the inductive coupling components 47, visualized as a coil, for the contactless communication with another NFC-capable device (visualized in FIG. 4 as a barcode reader 57) and the power supply components 48. When an inductive coupling is present, the power supply components 48 generate a second power supply voltage VCC2 with respect to the reference potential GND to energize the NFC module 45, making possible the operation of its digital components. The digital components are realized with the aid of a second microcontroller 49, which likewise has an internal memory 50 and which is connected to the analog components 46 for purposes of communication by a NFC communication protocol. The NFC module is connected by a second bus 51 to the display module 43, especially to the first microcontroller 31. The operating system of the NFC module 49 can be stored in the internal memory 50 or also in one of the memories 36, 32 of the display module, to which the second microcontroller 49 may gain access. Once the operating system has finished running, it provides the NFC communication protocol.

ESL 8 has an ultra-deep sleep mode, which is adopted in a delivery state and in a storage state and in which practically no energy consumption occurs. This is realized with the aid of an on/off functionality of the power supply stage 42, a control line for sending a power supply control signal VS through the NFC module, as well as a configuring of the NFC module to generate the power supply control signal VS after the recognizing and executing of a power on/off command. When delivered from the factory, the power supply 42 is switched off. ESL 8 is in the delivery state, in which it has no knowledge as to the radio network of the base stations 25, 26. The power supply stage 42 must be activated with the aid of the NFC module 45 as the result of an NFC communication with another device before a reception readiness is present for a communication according to the first communication protocol. If the power supply stage 42 is switched off afterwards, the storage state will be present. It may be advantageous especially in the case of a switching off to inform the processing stage 31 as to this process, which is symbolized by the providing of the power supply control signal VS, so that the data processing is ended in controlled manner so as to avoid a loss of data.

Figure 4:
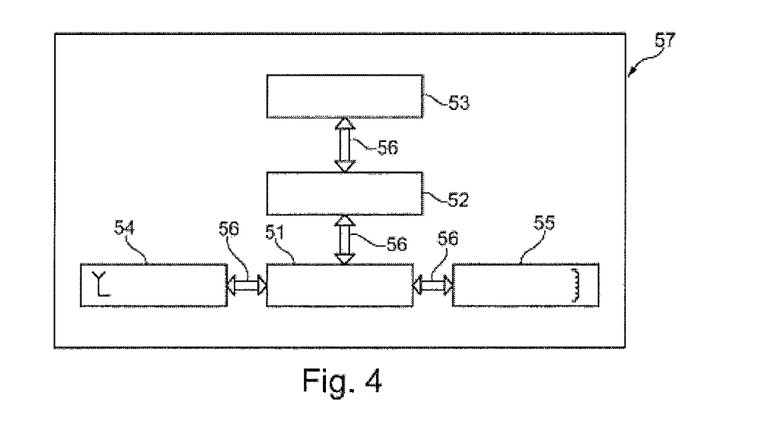
FIG. 4 a block diagram of a hand communication device.

The barcode reader 57 represented in FIG. 4 has a fourth microcontroller 51, a barcode reading stage 52 for reading and digitizing a barcode, a display/data entry stage 53 for interaction with a user, a WLAN communication stage 54 (WLAN communication means are visualized with the aid of an antenna symbol) for communication with the access point 27 and a NFC communication stage 55 (NFC communication means are symbolized with the help of an inductance (coil)) for the communication with ESL 2-19 according to a NFC communication protocol. The mentioned electronic components are interconnected by means of a data signal bus 56.

The ESL 8 as delivered from the factory is in the delivery state, as mentioned. At the supermarket, an employee holds the barcode reader 57 in immediate proximity to ESL 8, as indicated in the bottom right of FIG. 1, and relays by means of the NFC communication, symbolized by fourth radio signals FS4, a wake-up command to ESL 8, which is executed in the NFC module 45. From the NFC module 45 the power supply stage 42 is switched on, whereupon the electronic components of the display module 43 may commence their operation and the readiness to receive data via the first radio interface 44 is started for the first time.

Furthermore, the network key needed for the communication via the first radio interface 44 is handed over with the aid of the NFC communication and stored in ESL 8, after which ESL 8 carries out a connection setup with a radio-available base station, in the present instance, with the first base station 25.

Now, with the aid of the NFC module 45, it is also possible to control or influence operating states of ESL 8 in ongoing operation, and this separate from the timetable dictated by the first communication protocol for the availability or non-availability of the first radio interface 44. Thus, e.g., at the time TK represented in FIG. 2, a NFC communication may be established with ESL 8. Depending on whether or not a cooperation with the processing stage 31 or other electronic components of the display module 43 is necessary for the influencing of an operating state, a collective or selective activating of these required electronic components by the NFC module 45 may occur. Reception readiness of the first radio interface 44 need not be produced. The power supply of the activated components may occur with the aid of the first power supply voltage VCC1 or also with the aid of the second power supply voltage VCC2 available in the NFC module 45, which is then adapted to the required value of the first power supply VCC1.

The NFC module 45 may also be used to set operating parameters, such as the latency time to be used in the communication according to the first communication protocol. Thus, for example, the reaction time of ESL 8 may be slowed down by prolonging the duration of the sleep state. The duration of the prolonged sleep state (not visualized in the figures) then amounts to a multiple (such as "N" times, where "N" is a whole number) of the sleep state dwell time DR plus "N−1" times the reception time duration DE, in order to provide once again in good time (synchronously) a reception readiness for a communication with the respective base station for the relatively short interval of the reception time duration DE after elapsing of the total time so calculated in the prolonged sleep state. If no reactivating command comes from the base station, another prolonged sleep state will occur, and so forth. From time to time, ESL 8 in its storage state is available synchronously for a communication with the base station, and it may also be switched by a command received from the base station from the storage state to the routine display operation. However, this may also be done by a NFC communication with one of the barcode readers 57.

If ESL 8 is moved from one rack location to another rack location, e.g., because it is needed there, an immediate reconnection to the available base station 25, 26 can be initiated with the aid of the NFC module 45 in order to update the display. This is especially advantageous when ESL 8 is removed from the radio range of the first base station 25 and introduced into the radio range of the second base station 26.

For example, if it is decided in the daily operational business of the supermarket, to remove an item from the offerings and there is no need at present for the operation of the respective ESL 8, the ESL 8 may also be placed in the storage state with the aid of the NFC module, in which no energy consumption occurs. The ESL 8 if needed again may also be returned to operation from the storage state similar to the awakening from the delivery state and be incorporated in the radio network of the first or second base station 25, 26. It is advantageous here that the network key already be memorized in it, i.e., it is immediately available.

Even if the discussed sample embodiment always indicates a barcode reader, it should be mentioned in this place that any other NFC communication-capable device may be meant, which besides its NFC communication capability and the ability to influence the operating state of an ESL with the aid of the NFC communication capability, may also have other functionality or no other functionality at all.

In conclusion, it is once more pointed out that the above figures described in detail are only sample embodiments which can be modified by the skilled person in various ways, without leaving the scope of the invention. For sake of completeness, it is also pointed out that the use of the indefinite article "a" or "an" does not rule out the respective features also being present in plural number.

The invention claimed is:

1. A display device implemented as a battery powered electronic price display sign, in particular designed for fastening to a rack, especially preferably designed for fastening to the end of the rack, comprising:
   a first radio interface, which is connected to a processing stage of the display device, for communication with a base station in accordance with a first communication protocol for the purpose of controlling states of the processing stage; and
   a second radio interface, which is connected to the processing stage and is designed for contactless communication in accordance with an RFID-specification of an NFC-specification protocol with a communication device different from the base station, to start the readiness of the processing stage to receive data via the first radio interference for a delivery state and a storage state of the display device;
   wherein the display device is designed to assume the storage state after exiting the delivery state for the first time, wherein the delivery state is adopted during the production of the display device and at no time is there a readiness to receive data via the first radio interface;
   wherein the processing stage is not ready to receive data by means of the first radio interface in the storage state and by contrast with the delivery state, the display device now already has a network key for communication with the base station, wherein the network key was received via said second radio interface and stored prior to entry into the storage stage; and,
   wherein the presence of the storage state is ascertained with the aid of a value in a storage, such that correct steps can be taken for continued operation after a renewed activation.

2. The display device as claimed in claim 1, wherein a power supply stage of the display device is switched off in the delivery state.

3. The display device as claimed in claim 2, wherein a second display device is designed, with the assistance of the second interface, to start the readiness of the processing stage to receive data via the first radio interface, wherein the second radio interface is designed to check a piece of information stored in the display device that determines whether the processing stage has been started for the first time, and accordingly to activate the power supply for the processing stage by an internal battery.

4. The display device as claimed in claim 1, wherein the delivery state is assumed during the production of the display device.

5. The display device as claimed in claim 1, wherein a power supply stage of the display device is switched off in the storage state.

6. The display device as claimed in claim 5, the display device for the purpose of assuming the storage state being designed such that the processing stage is informed as to the switching off of the power supply stage with the aid of a Power supply control signal and the processing stage terminates the data processing in controlled manner.

7. The display device as claimed in claim 1, wherein the further radio interface is designed for communication according to a RFID specification, especially according to a NFC specification.

8. The display device as claimed in claim 1, wherein the processing stage is designed to assume an active state for the receiving of data via the first radio interface and to assume a sleep or resting state without readiness to receive data via the first radio interface between two active states, wherein the processing stage for the purpose of assuming the storage state is designed to receive data representing latency settings which define a slower behavior during the communication with the base station.

9. The display device as claimed in claim 8, wherein the processing stage is designed to receive the data representing the latency settings via the further radio interface.

10. The display device as claimed in claim 1, wherein the processing stage is designed to assume the storage state as a consequence of a reception of data via the further radio interface.

11. The display device as claimed in claim 1, which is designed to exit the storage state as a consequence of a reception of data via the further interface.

12. The display device as claimed in claim 1, wherein the processing stage is designed to receive and execute, with the aid of the data which can be received via the further radio interface, a reconnect command for the renewed assuming of a connection setup state for the purpose of establishing a radio link to a base station.

13. The display device as claimed in claim 1, wherein the display device is designed to recognize and execute, after exiting the delivery state, a first reset command for the renewed assuming of the delivery state that is received with the aid of the further radio interface.

14. The display device as claimed in claim 1, wherein the processing stage is designed to receive and execute a second reset command for assuming the storage state that is received with the aid of the further radio interface.

15. The display device as claimed in claim 11, wherein the execution of the respective reset command in the display device depends on whether a correct password was provided during the relaying of the command.

16. The display device as claimed in claim 12, wherein the execution of the respective reset command in the display device depends on whether a correct password was provided during the relaying of the command.

* * * * *